US010969799B2

(12) United States Patent
Ding et al.

(10) Patent No.: US 10,969,799 B2
(45) Date of Patent: Apr. 6, 2021

(54) SYSTEM FOR AND METHOD OF FAST PULSE GAS DELIVERY

(71) Applicant: MKS Instruments, Inc., Andover, MA (US)

(72) Inventors: Junhua Ding, Boxborough, MA (US); Michael L'Bassi, Sterling, MA (US); Tseng-Chung Lee, Lexington, MA (US)

(73) Assignee: MKS INSTRUMENTS, INC., Andover, MA (US)

( * ) Notice: Subject to any disclaimer, the term of this patent is extended or adjusted under 35 U.S.C. 154(b) by 252 days.

(21) Appl. No.: 16/168,812

(22) Filed: Oct. 23, 2018

(65) Prior Publication Data

US 2019/0056755 A1  Feb. 21, 2019

Related U.S. Application Data

(60) Division of application No. 14/209,216, filed on Mar. 13, 2014, now Pat. No. 10,126,760, which is a
(Continued)

(51) Int. Cl.
    *G05D 7/06* (2006.01)

(52) U.S. Cl.
    CPC ...... *G05D 7/0635* (2013.01); *Y10T 137/0318* (2015.04); *Y10T 137/86389* (2015.04)

(58) Field of Classification Search
    CPC .......... G05D 7/0635; Y10T 137/86389; Y10T 137/0318
    (Continued)

(56) References Cited

U.S. PATENT DOCUMENTS

| 4,783,343 A | 11/1988 | Sato |
| 4,916,089 A | 4/1990 | Van Suchtelen et al. |

(Continued)

FOREIGN PATENT DOCUMENTS

| CN | 101023199 | 8/2007 |
| CN | 101256397 | 5/2012 |

(Continued)

OTHER PUBLICATIONS

Office Action dated Jul. 2, 2014 from Corresponding Application No. 201180056074.1.
(Continued)

*Primary Examiner* — Tarun Sinha
(74) *Attorney, Agent, or Firm* — Hamilton, Brook, Smith & Reynolds, P.C.

(57) ABSTRACT

A system for delivering pulses of a desired mass of gas to a tool, comprising: a mass flow controller including flow sensor, a control valve and a dedicated controller configured and arranged to receive a recipe of a sequence of steps for opening and closing the control valve so as to deliver as sequence of gas pulses as a function of the recipe. The mass flow controller is configured and arranged so as to operate in either one of at least two modes: as a traditional mass flow controller (MFC) mode or in a pulse gas delivery (PGD) mode. Further, the mass flow controller includes an input configured to receive an input signal; an output configured to provide an output signal; a communication port configured to receive program instructions; memory configured and arranged to receive programming data determining the programmed configuration of the mass flow controller as either a digital or analog configuration; and a processor/controller for operating the mass flow controller in accordance with the programmed configuration.

44 Claims, 8 Drawing Sheets

Related U.S. Application Data continuation-in-part of application No. 13/344,387, filed on Jan. 5, 2012, now Pat. No. 10,353,408, which is a continuation-in-part of application No. 13/035,534, filed on Feb. 25, 2011, now Pat. No. 9,348,339.

(60) Provisional application No. 61/525,452, filed on Aug. 19, 2011.

(58) Field of Classification Search
USPC .......................................................... 73/861
See application file for complete search history.

(56) References Cited

U.S. PATENT DOCUMENTS

| | | |
|---|---|---|
| 5,524,084 A | 6/1996 | Wang et al. |
| 5,565,038 A | 10/1996 | Ashley |
| 5,591,061 A | 1/1997 | Ikeda et al. |
| 5,660,207 A | 8/1997 | Mudd |
| 5,865,205 A | 2/1999 | Wilmer |
| 6,000,830 A | 12/1999 | Asano et al. |
| 6,089,537 A | 7/2000 | Olmsted |
| 6,119,710 A | 9/2000 | Brown et al. |
| 6,125,869 A | 10/2000 | Horiuchi |
| 6,269,279 B1 | 7/2001 | Todata et al. |
| 6,287,980 B1 | 9/2001 | Hanazaki et al. |
| 6,405,745 B1 | 6/2002 | Kar et al. |
| 6,503,330 B1 | 1/2003 | Sneh et al. |
| 6,631,334 B2 | 10/2003 | Grosshart |
| 6,638,859 B2 | 10/2003 | Sneh et al. |
| 6,820,632 B2 | 11/2004 | Ohmi |
| 6,911,092 B2 | 6/2005 | Sneh |
| 6,913,031 B2 | 7/2005 | Nawata et al. |
| 7,369,959 B2 | 5/2008 | Evans |
| 7,428,373 B2 | 9/2008 | Sandhu |
| 7,474,968 B2 | 1/2009 | Ding et al. |
| 7,615,120 B2 | 11/2009 | Ali et al. |
| 7,628,860 B2 | 12/2009 | Shajii et al. |
| 7,628,861 B2 | 12/2009 | Clark |
| 7,662,233 B2 | 2/2010 | Sneh |
| 7,735,452 B2 | 6/2010 | Spartz |
| 7,794,544 B2 | 9/2010 | Nguyen et al. |
| 7,829,353 B2 | 11/2010 | Shajii et al. |
| 8,036,780 B2 | 10/2011 | Gotoh |
| 8,297,223 B2 | 10/2012 | Liu et al. |
| 10,126,760 B2 | 11/2018 | Ding et al. |
| 2002/0007790 A1 | 1/2002 | Park |
| 2002/0114732 A1 | 8/2002 | Vyers |
| 2003/0180458 A1 | 9/2003 | Sneh |
| 2004/0050326 A1 | 3/2004 | Thilderkvist et al. |
| 2004/0187928 A1 | 9/2004 | Ambrosina et al. |
| 2004/0230113 A1 | 11/2004 | Bolam et al. |
| 2004/0244837 A1 | 12/2004 | Nawata |
| 2005/0081787 A1 | 4/2005 | Im et al. |
| 2005/0103264 A1 | 5/2005 | Jansen |
| 2005/0160983 A1 | 7/2005 | Sneh |
| 2005/0189018 A1* | 9/2005 | Brodeur .............. G05D 7/0635 137/487.5 |
| 2005/0196533 A1 | 9/2005 | Hasebe et al. |
| 2005/0207943 A1 | 9/2005 | Puzey |
| 2005/0223979 A1 | 10/2005 | Shajii et al. |
| 2005/0249876 A1 | 11/2005 | Kawahara et al. |
| 2005/0282365 A1 | 12/2005 | Hasebe et al. |
| 2006/0032442 A1 | 2/2006 | Hasebe |
| 2006/0060139 A1 | 3/2006 | Meneghini et al. |
| 2006/0130744 A1 | 6/2006 | Clark |
| 2006/0130755 A1 | 6/2006 | Clark |
| 2006/0207503 A1 | 9/2006 | Meneghini et al. |
| 2007/0026540 A1 | 2/2007 | Nooten et al. |
| 2007/0039549 A1 | 2/2007 | Shajii et al. |
| 2007/0039550 A1 | 2/2007 | Shajii et al. |
| 2007/0204702 A1 | 9/2007 | Melcer et al. |
| 2007/0240778 A1 | 10/2007 | L'Bassi et al. |
| 2008/0086229 A1 | 4/2008 | Ueda et al. |
| 2008/0095936 A1 | 4/2008 | Senda et al. |
| 2008/0097640 A1 | 4/2008 | Cho et al. |
| 2008/0167748 A1 | 7/2008 | Ding |
| 2008/0282365 A1 | 11/2008 | Gepstein et al. |
| 2009/0004836 A1 | 1/2009 | Singh et al. |
| 2009/0008369 A1 | 1/2009 | Nozawa et al. |
| 2009/0018692 A1 | 1/2009 | Yoneda |
| 2009/0163040 A1 | 6/2009 | Maeda et al. |
| 2009/0248213 A1 | 10/2009 | Gotoh |
| 2010/0125424 A1 | 5/2010 | Ding et al. |
| 2010/0305899 A1 | 12/2010 | Czompo et al. |
| 2011/0033956 A1 | 2/2011 | Sakai |
| 2011/0174219 A1 | 7/2011 | Meneghini et al. |
| 2012/0073672 A1 | 3/2012 | Ding |
| 2012/0076935 A1 | 3/2012 | Ding |
| 2012/0216888 A1 | 8/2012 | Ding et al. |
| 2013/0025786 A1 | 1/2013 | Davidkovich et al. |
| 2013/0186322 A1 | 7/2013 | Hirose et al. |
| 2013/0186332 A1 | 7/2013 | Hirose et al. |

FOREIGN PATENT DOCUMENTS

| | | |
|---|---|---|
| CN | 202677205 | 1/2013 |
| CN | 103328936 | 9/2013 |
| CN | 103597325 | 2/2014 |
| DE | 102004015174 | 10/2005 |
| EP | 0969342 | 1/2000 |
| EP | 2006414 | 12/2008 |
| JP | 61229319 | 10/1986 |
| JP | 06045256 | 2/1994 |
| JP | H06-324704 A | 11/1994 |
| JP | 2000012454 | 1/2000 |
| JP | 2000200780 | 7/2000 |
| JP | 2002329674 | 11/2002 |
| JP | 2003263230 | 9/2003 |
| JP | 2005-503603 A | 2/2005 |
| JP | 2006222141 | 8/2006 |
| JP | 2007-087029 A | 4/2007 |
| JP | 2007535617 | 12/2007 |
| JP | 2008091625 | 4/2008 |
| JP | 2009530737 | 8/2009 |
| JP | 2009-245132 A | 10/2009 |
| JP | 2009245132 | 10/2009 |
| JP | 2013-543540 A | 12/2013 |
| KR | 1020070012465 | 1/2007 |
| KR | 1020090104678 | 10/2009 |
| TW | 223056 | 11/2004 |
| TW | 201134978 | 10/2011 |
| WO | WO 02/073329 | 9/2002 |
| WO | WO 2005/103328 | 11/2005 |
| WO | WO 2007/108871 | 9/2007 |
| WO | WO 2008/112423 | 9/2008 |
| WO | WO 2011/090825 | 7/2011 |
| WO | 2012050866 A1 | 4/2012 |
| WO | 20120116281 A1 | 8/2012 |
| WO | WO 2013/052364 A1 | 4/2013 |

OTHER PUBLICATIONS

Office Action dated Apr. 2, 2014 from Corresponding Application No. 2013-531758.
Office Action dated Apr. 2, 2014 from Corresponding Application No. 2013-531756.
English Version of the Search Report dated Jan. 11, 2014 from Corresponding Taiwan Patent Application No. 100135295.
Taiwan Version of Office Action dated Jan. 22, 2014 from Corresponding Taiwan Patent Application No. 100135295.
Office Action dated Nov. 24, 2014 from Corresponding German Application No. 112011103330.3.
Office Action dated Nov. 27, 2014 from Corresponding German Application No. 112011103337.0.
The International Search Report and The Written Opinion of the International Searching Authority from Corresponding PCT Application No. PCT/US2012/026519, entitled "System for and Method of Fast Pulse Gas Delivery," dated Jun. 18, 2012.
The International Search Report and The Written Opinion of the International Searching Authority from Corresponding PCT Appli-

(56) References Cited

OTHER PUBLICATIONS cation No. PCT/US2011/053618, entitled "Method and Apparatus for Multiple-Channel Pulse Gas Delivery System," dated Jan. 16, 2012.
The International Search Report and The Written Opinion of the International Searching Authority from Corresponding PCT Application No. PCT/US2011/053614, entitled "System for and Method of Fast Pulse Gas Delivery," dated Dec. 9, 2011.
Office Action dated Jun. 18, 2015 from Corresponding U.S. Appl. No. 13/344,387.
The International Search Report and The Written Opinion of the International Searching Authority from Corresponding PCT Application No. PCT/US2015/015363, entitled "System for and Method of Fast Pulse Gas Delivery," dated Jun. 24, 2015.
Extended European Search Report received in European Application No. 15760881.1, dated Oct. 26, 2017; 5 pages.
Final Office Action received in U.S. Appl. No. 14/269,778, dated Nov. 17, 2017, 14 pages.
Final Office Action for U.S. Appl. No. 13/344,387, dated May 12, 2017.
The Extended European Search Report for EP Application No. 19161633.3, entitled "System for and Method of Fast Pulse Gas Delivery," dated Aug. 26, 2019.

\* cited by examiner

SYSTEM FOR AND METHOD OF FAST PULSE GAS DELIVERY

CROSS-REFERENCE TO RELATED APPLICATIONS

This application is a divisional application of copending U.S. patent application Ser. No. 14/209,216, entitled SYSTEM FOR AND METHOD OF FAST PULSE GAS DELIVERY, filed Mar. 13, 2014 in the names of Junhua Ding, Michael L'Bassi and Tseng-Chung Lee and assigned to the present assignee; which is a continuation-in-part of copending U.S. patent application Ser. No. 13/344,387, entitled SYSTEM FOR AND METHOD OF FAST PULSE GAS DELIVERY, filed Jan. 5, 2012 in the names of Junhua Ding, Michael L'Bassi and Tseng-Chung Lee and assigned to the present assignee; which claims priority from U.S. Provisional Patent Application No. 61/525,452, entitled SYSTEM AND METHOD OF FAST PULSE GAS DELIVERY, filed Aug. 19, 2011 in the names of Junhua Ding, Michael L'Bassi and Tseng-Chung Lee and assigned to the present assignee; U.S. patent application Ser. No. 13/344,387 is also a continuation-in-part of U.S. patent application Ser. No. 13/035,534, entitled METHOD AND APPARATUS FOR MULTIPLE-CHANNEL PULSE GAS DELIVERY SYSTEM, filed Feb. 25, 2011 in the name of Junhua Ding and assigned to the present assignee, now U.S. Pat. No. 9,348,339, issued May 24, 2016. The entire teachings of the above applications are incorporated herein by reference.

BACKGROUND

Field

This disclosure relates generally to mole or gas delivery devices, and more particularly, to a method of and system for pulse gas delivery. As used herein the term "gas(es)" includes the term "vapor(s)" should the two terms be considered different.

Overview

The manufacture or fabrication of semiconductor devices often requires the careful synchronization and precisely measured delivery of as many as a dozen gases to a process tool. For purposes herein, the term "process tool" may or may not include a process chamber. Various recipes are used in the manufacturing process, involving many discrete process steps, where a semiconductor device is typically cleaned, polished, oxidized, masked, etched, doped, metalized, etc. The steps used, their particular sequence, and the materials involved all contribute to the making of particular devices.

As device sizes have shrunk below 90 nm, one technique known as atomic layer deposition, or ALD, continues to be required for a variety of applications, such as the deposition of barriers for copper interconnects, the creation of tungsten nucleation layers, and the production of highly conducting dielectrics. In the ALD process, two or more precursor gases are delivered in pulses and flow over a wafer surface in a process tool maintained under vacuum. The two or more precursor gases flow in an alternating or sequential manner so that the gases can react with the sites or functional groups on the wafer surface. When all of the available sites are saturated from one of the precursor gases (e.g., gas A), the reaction stops and a purge gas is used to purge the excess precursor molecules from the process tool. The process is repeated, as the next precursor gas (i.e., gas B) flows over the wafer surface. For a process involving two precursor gases, a cycle can be defined as one pulse of precursor A, purge, one pulse of precursor B, and purge. A cycle can include the pulses of additional precursor gases, as well as repeats of a precursor gas, with the use of a purge gas in between successive pulses of precursor gases. This sequence is repeated until a final geometric characteristic, such as thickness, is reached. These sequential, self-limiting surface reactions result in one monolayer of deposited film per cycle.

The delivery of pulses of precursor gases introduced into a process tool can be controlled using a pulse gas delivery (PGD) device (the controlled flow of gas into and out of a delivery chamber using inlet and outlet on/off-type valves simply by timing the opening of the outlet shutoff valve for a predetermined period of time to deliver a desired amount (mass), in the form of a pulse, of precursor gas into the process chamber of the process tool). Alternatively, a mass flow controller ("MFC"), which is a self-contained device comprising a transducer, control valve, and control and signal-processing electronics, has been used to deliver an amount of gas at predetermined and repeatable flow rates, in short time intervals.

Pulse gas delivery (PGD) devices are usually pressure based and optimized to provide repeatable and precise quantities (mass) of gases for use in semiconductor manufacturing processes, such as ALD processes. Typically, as shown in FIG. 1, current PGD devices include a delivery gas chamber 12, an inlet shut off valve 14 for controlling the flow of gas from a gas supply 52 into chamber 12, and an outlet shut off valve 16 for controlling the flow of gas from the delivery chamber 12 to the process tool 54. A host controller or computer 50 runs the gas delivery process as well as carries out all of the control and diagnostic functions for the process tool, including, for example, safety monitoring and control, RF power signals, and other common tasks. Since the volume of the delivery chamber 12 is fixed and known, the amount of gas, measured in moles, introduced into the delivery chamber with each pulse is a function of the gas type, the temperature of the gas in the chamber, and the pressure drop of the gas during the duration of the pulse delivered from the chamber 12. Accordingly, pressure sensor 18 and temperature sensor 20 provide measurements of the pressure and temperature to the controller 24 so that the gas delivered from the chamber during each pulse can be determined. The control logic for running the PGD device has thus been traditionally and typically on the host controller 50 associated with the process tool. Improvements are described in the copending Applications by providing a dedicated controller 24 for separately controlling the pulse delivery process by operation of the inlet and outlet valves 14 and 16.

More recently, certain processes have been developed that require high speed pulsed or time-multiplexed processing. For example, the semiconductor industry is developing advanced, 3-D integrated circuits thru-silicon vias (TSVs) to provide interconnect capability for die-to-die and wafer-to-wafer stacking. Manufacturers are currently considering a wide variety of 3-D integration schemes that present an equally broad range of TSV etch requirements. Plasma etch technology such as the Bosch process, which has been used extensively for deep silicon etching in memory devices and MEMS production, is well suited for TSV creation. The Bosch process, also known as a high speed pulsed or time-multiplexed etching, alternates repeatedly between two modes to achieve nearly vertical structures using $SF_6$ and the deposition of a chemically inert passivation layer using $C_4F_8$. Targets for TSV required for commercial success are adequate functionality, low cost, and proven reliability.

These high speed processes require fast response times during the transition time of the pulses in order to better control the processes, making the use of pressure based pulse gas delivery devices problematic. Currently, one approach to increase response time is to use a fast response mass flow controller (MFC) to turn on and off gas flows of the delivery pulse gases delivered to the process tool according to signals received from a host controller. The repeatability and accuracy of pulse delivery using a fast response MFC with a host controller, however, leaves room for improvement, because response times are dependent on the workload of the host controller. The host controller may be prevented from sending timely control signals if it is performing other functions that require its attention. Further, with short duration control signals being sent from the host controller to the mass flow controller, communication jitter can occur, causing errors in the delivery of pulses of gas. Workload of the host controller and communication jitter are two sources of error that reduce the repeatability and accuracy of pulse gas delivery when relying on fast communication between the host controller and the mass flow controller delivering pulses of gas.

Description of Related Art

Examples of pulse mass flow delivery systems can be found in U.S. Pat. Nos. 7,615,120; 7,615,120; 7,628,860; 7,628,861, 7,662,233; 7,735,452 and 7,794,544; U.S. Patent Publication Nos. 2006/0060139; and 2006/0130755, and pending U.S. application Ser. No. 12/689,961, entitled CONTROL FOR AND METHOD OF PULSED GAS DELIVERY, filed Jan. 19, 2010 in the name of Paul Meneghini and assigned the present assignee; and U.S. patent application Ser. No. 12/893,554, entitled SYSTEM FOR AND METHOD OF FAST PULSE GAS DELIVERY, filed Sep. 29, 2010 in the name of Junhua Ding, and assigned to the present assignee; and U.S. patent application Ser. No. 13/035,534, entitled METHOD AND APPARATUS FOR MULTIPLE-CHANNEL PULSE GAS DELIVERY SYSTEM, filed Feb. 25, 2011 in the name of Junhua Ding and assigned to the present assignee.

SUMMARY

As discussed above, workload of a host controller and communication jitter reduce the repeatability and accuracy of pulse gas delivery. Hence, by reducing the workload of the host controller and moving control signals from the host to the controller of the MFC, these two factors are reduced, resulting in improved repeatability and accuracy of the gas pulse delivery.

In one embodiment, a programmable mass flow controller comprising: an input configured to receive an input signal and an output configured to provide an output signal. A communication port is configured to receive program instructions including instructions relating to the programmed configuration of the mass flow controller, and programming data. A flow sensor is configured to sense the flow of gas through the mass flow controller; and a control valve is configured to control the flow of gas though the mass flow controller. Memory is configured and arranged to receive programming data determining the programmed configuration of the mass flow controller as either a digital or analog configuration; and a processor/controller is providing to operate the mass flow controller in accordance with the programmed configuration.

In one embodiment the programmed digital configuration enables the mass flow controller to respond to digital signals applied to the input. In one embodiment the programmed analog configuration enables the mass flow controller to respond to analog signals applied to the input. In one embodiment the communication port also is configured to receive data relating to parameters associated with at least one of two modes of operation of the mass flow controller. In one embodiment the at least one of two modes of operation of the mass flow controller includes a classic mass flow controller mode of operation, wherein the input signal represents the flow setpoint for operating the MFC in the classic mass flow controller mode of operation. In one embodiment the at least one of two modes of operation of the mass flow controller includes a pulse gas delivery mode of operation, wherein the input signal represents a pulse trigger signal for operating the MFC so as to deliver a sequence of pulses in the pulse gas delivery mode of operation. In one embodiment the communication port is configured to receive parameters for pulse gas delivery. In one embodiment the parameters are associated with a mole delivery mode of gas pulse delivery operation. In one embodiment the parameters include the pulse-on period, pulse-off period, the mole delivery setpoint, and the number of pulses. In one embodiment the mass flow controller further includes a digital communication interface that includes the digital communication port. In one embodiment the mass flow controller further includes an analog communication interface having an analog input pin for forming the input and receiving an analog trigger signal input, and an analog output pin for forming the output and providing an analog synchronization signal output. In one embodiment the mass flow controller further includes both a digital communication interface and an analog communication interface. In one embodiment the output signal represents a synchronization signal for use in synchronizing the timing of the delivery of a sequence of pulses with the operation of another device. In one embodiment the another device is a second mass flow controller. In one embodiment the synchronization signal is a trigger signal input to the second mass flow controller. In one embodiment the another device is an RF power generator. In one embodiment the another device is a pressure controller. In one embodiment the synchronization signal is generated prior to the completion of the delivery of the sequence of pulses. In one embodiment the synchronization signal is generated simultaneously with the completion of the delivery of the sequence of pulses. In one embodiment the synchronization signal is generated after the completion of the delivery of the sequence of pulses by a predetermined delay. In one embodiment the pulse trigger signal is a digital signal. In one embodiment the pulse trigger signal is an analog signal. In one embodiment the output signal is a TTL synchronization output signal for use by another device.

In one embodiment a system comprises: a multi-channel gas delivery system including a plurality of flow channels, each channel comprising a mass flow controller configured to control the flow of gas through the corresponding channel. Each mass flow controller includes: an input configured to receive an input signal; an output configured to provide an output signal; a communication port configured to receive program instructions including instructions on the operational configuration of each mass flow controller; a flow sensor configured to sense the flow of gas through the mass flow controller of the corresponding channel; a control valve configured to control the flow of gas though the mass flow controller of the corresponding channel; memory configured and arranged to receive programming data determining the programmed configuration of the mass flow controller as either a digital or analog configuration; and a processor/controller for operating the mass flow controller in accordance with the programmed configuration. The input signal to the mass flow controller initiates the operation of the mass flow controller to deliver a prescribed amount of gas, and the output signal is generated as a function of the timing of the delivery so that the output signal can be used to synchronize each mass flow controller to at least one other device.

In one embodiment the output signal of at least one mass flow controller is used as an input signal to initiate the operation of another one of the mass flow controllers of the multi-channel fast pulse gas delivery system to deliver a prescribed amount of gas so that the mass flow controllers define a daisy chain of devices sequentially providing the delivery of prescribed amounts of gas through the corresponding channels.

In one embodiment the output signal of each of the mass flow controllers is used to provide control signals applied to an RF power generator. In one embodiment the output signal of each of the mass flow controllers is used to provide control signals applied to a pressure controller. In one embodiment the input and output signals are analog signals. In one embodiment the digital communication port of each mass flow controller is configured to receive data relating to parameters associated with at least one of two modes of operation of the mass flow controller. In one embodiment the at least one of two modes of operation of each mass flow controller includes a pulse gas delivery mode of operation, wherein the input signal represents a pulse trigger signal for operating the MFC so as to deliver a sequence of pulses in the pulse gas delivery mode of operation. In one embodiment the digital communication port is configured to receive parameters for pulse gas delivery. In one embodiment the parameters are associated with a mole delivery mode of gas pulse delivery operation. In one embodiment the parameters include the pulse-on period, pulse-off period, the mole delivery setpoint, and the number of pulses. In one embodiment the system further includes a digital communication interface that includes the digital communication port. In one embodiment the system further includes both a digital communication interface and an analog communication interface. In one embodiment the system further includes an analog communication interface having an analog input pin for forming the input and receiving an analog trigger signal input, and an analog output pin for forming the output and providing an analog synchronization signal output. In one embodiment the analog synchronization signal is generated prior to the completion of the delivery of the sequence of pulses. In one embodiment the analog synchronization signal is generated simultaneously with the completion of the delivery of the sequence of pulses. In one embodiment the analog synchronization signal is generated after the completion of the delivery of the sequence of pulses by a predetermined delay. In one embodiment the output signal is a TTL synchronization output signal for use by another device.

In one embodiment a method of operating a mass flow controller of the type comprising at least one communication port, comprises: receiving, at the communication port, program instructions including instructions relating to the operational configuration of the mass flow controller as responsive to either digital or analog input signals; and operating the mass flow controller in accordance with the programmed configuration.

In one embodiment a programmed digital operational configuration enables the mass flow controller to respond to digital signals applied to the input. In one embodiment a programmed analog operational configuration enables the mass flow controller to respond to analog signals applied to the input. In one embodiment receiving at the communication port program instructions includes receiving data relating to parameters associated with at least one of two modes of operation of the mass flow controller. In one embodiment at least one of two modes of operation of the mass flow controller includes a classic mass flow controller mode of operation, and the input signal represents the set point setting for operating the MFC in the classic mass flow controller mode of operation. In one embodiment at least one of two modes of operation of the mass flow controller includes a pulse gas delivery mode of operation, and further delivering a sequence of pulses in the pulse gas delivery mode of operation in response to an input signal. In one embodiment receiving instructions at the communication port program includes receiving parameters for pulse gas delivery. In one embodiment the parameters for pulse gas delivery are associated with a mole delivery mode of gas pulse delivery operation. In one embodiment the parameters include the pulse-on period, pulse-off period, the mole delivery setpoint, and the number of pulses. In one embodiment the method further includes receiving an analog trigger signal input at an analog input pin of an analog communication interface and providing an analog synchronization signal output at an analog output pin of the analog communication interface. In one embodiment the method further includes generating an output signal representing a synchronization signal for use in synchronizing the timing of the delivery of a sequence of pulses with the operation of another device. In one embodiment the another device is a second mass flow controller. In one embodiment the synchronization signal is a trigger signal for use as an input to the second mass flow controller. In one embodiment the another device is an RF power generator. In one embodiment the another device is a pressure controller. In one embodiment the method further includes generating the synchronization signal prior to the completion of the delivery of the sequence of pulses. In one embodiment the method further includes generating the synchronization signal simultaneously with the completion of the delivery of the sequence of pulses. In one embodiment the method further includes generating the synchronization signal by a predetermined delay after the completion of the delivery of the sequence of pulses. In one embodiment the trigger signal is generated as a digital signal. In one embodiment the trigger signal is generated as an analog signal. In one embodiment the output signal is a TTL synchronization output signal for use by another device.

In one embodiment a method of operating a multi-channel gas delivery system including a plurality of flow channels is provided. Each channel comprises a mass flow controller configured to control the flow of gas through the corresponding channel. The method comprises: providing an input signal to one of the mass flow controllers so as to initiate the operation of the mass flow controller to deliver a prescribed amount of gas; generating an output signal from the mass flow controller as a function of the timing of the delivery of the prescribed amount of gas so that the output signal can be used to synchronize each mass flow controller to at least one other device; receiving program instructions at a communication port including instructions on the operational configuration of each mass flow controller; determining the programmed configuration of the mass flow controller as either a digital or analog configuration as a function of the received instructions; and operating the mass flow controller in accordance with the programmed configuration. The input signal to the mass flow controller initiates the operation of the mass flow controller to deliver a prescribed amount of gas, and the output signal is generated as a function of the timing of the delivery so that the output signal can be used to synchronize each mass flow controller to at least one other device.

In one embodiment method further includes using the output signal of at least one mass flow controller as an input signal to initiate the operation of another one of the mass flow controllers of the multi-channel fast pulse gas delivery system to deliver a prescribed amount of gas so that the mass flow controllers define a daisy chain of devices sequentially providing the delivery of prescribed amounts of gas through the corresponding channels. In one embodiment the method further includes applying the output signal of each of the mass flow controllers as a control signal to an RF power generator. In one embodiment the method includes applying the output signal of each of the mass flow controllers as a control signal to a pressure controller. In one embodiment the input and output signals are analog signals. In one embodiment the method further includes receiving at a digital communication port of each mass flow controller data relating to parameters associated with at least one of two modes of operation of each such mass flow controller. In one embodiment the at least one of two modes of operation of each mass flow controller includes a pulse gas delivery mode of operation, wherein the input signal represents a pulse trigger signal for operating the MFC so as to deliver a sequence of pulses in the pulse gas delivery mode of operation. In one embodiment receiving at a digital communication port of each mass flow controller data relating to parameters associated with at least one of two modes of operation of each such mass flow controller includes receiving parameters for pulse gas delivery. In one embodiment receiving at a digital communication port of each mass flow controller data relating to parameters associated with at least one of two modes of operation of each such mass flow controller includes receiving parameters associated with a mole delivery mode of gas pulse delivery operation. In one embodiment the parameters include the pulse-on period, pulse-off period, the mole delivery setpoint, and the number of pulses. In one embodiment the output signal of each mass flow controller is an analog synchronization signal, and further including generating the analog synchronization signal prior to the completion of the delivery of the sequence of pulses by the mass flow controller. In one embodiment the analog synchronization signal is generated simultaneously with the completion of the delivery of the sequence of pulses. In one embodiment the analog synchronization signal is generated after the completion of the delivery of the sequence of pulses by a predetermined delay. In one embodiment the output signal of each mass flow controller is a TTL synchronization output signal for use by another device.

These, as well as other components, steps, features, objects, benefits, and advantages, will now become clear from a review of the following detailed description of illustrative embodiments and the accompanying drawings.

BRIEF DESCRIPTION OF DRAWINGS

The drawings disclose illustrative embodiments. They do not set forth all embodiments. Other embodiments may be used in addition or instead. Details which may be apparent or unnecessary may be omitted to save space or for more effective illustration. Conversely, some embodiments may be practiced without all of the details which are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details which may be apparent or unnecessary may be omitted to save space or for a more effective presentation. Conversely, some embodiments may be practiced without all of the details which are disclosed.

Figure 2:
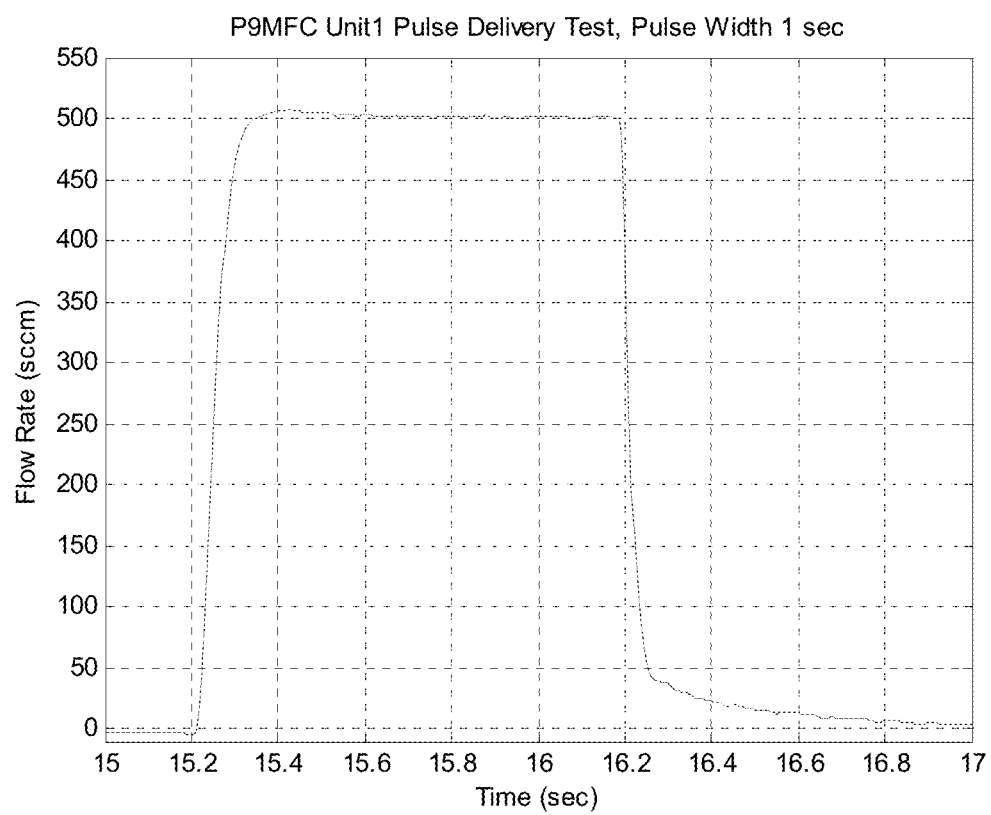
FIG. 2 are graphical representations of a test gas pulse illustrating the flow rate over time.

An experiment was conducted using a test set-up for analyzing fast gas pulse delivery using a fast response MFC controlled by a host computer in order to illustrate the steepness of the transient edges of each pulse of gas delivered from the MFC as a measure of the response of the MFC going from zero flow to full flow and from full flow to zero flow. Each pulse of gas delivered by the MFC was controlled with a host computer, which included a sequence of delivery steps typical of a recipe. One pulse produced by a fast response MFC during the delivery phase is shown in FIG. 2. As shown the transient edges of the gas pulse (flow rate vs. time) is fairly steep indicating quick response times of the control valve of the MFC. In analyzing the results of the experiment, however, the performance suffered making the system unreliable for high speed processes such as the Bosch process.

More specifically, the experiment used a mass flow verifier to measure the amount of gas delivered from a fast response MFC controlled by a host computer, and data was generated to determine the repeatability of the system. The pulses of gas that were delivered by the MFC suffered from repeatability errors because of the variations in the timing of the response of the MFC to each pulse relative to the timing of the response to the previous pulse, i.e., repeatability errors with respect to the response of the MFC to a command from the host computer to provide a pulse varying from when it should occur based on the timing of the previous pulse and the time that it actually occurred. It was determined that among the causes for this error is the already high demand for the host controller's resources. Although a host controller may queue an on/off signal to be sent to the MFC, the signal may not be sent immediately, depending on the work load of the host controller at that moment. Similarly, even when an on/off signal is transmitted, communication jitter between the host controller and the MFC caused by a short and/or fast pulse width degrades the performance of the pulse gas delivery, including repeatable and accurate performance. The relative timing of pulses is crucial to the success of many high speed pulse delivery applications. Thus, it is desirable to provide a solution for high speed pulse delivery applications, such as the Bosch process used for TSV creation, that reduces or overcomes these problems.

Figure 3:
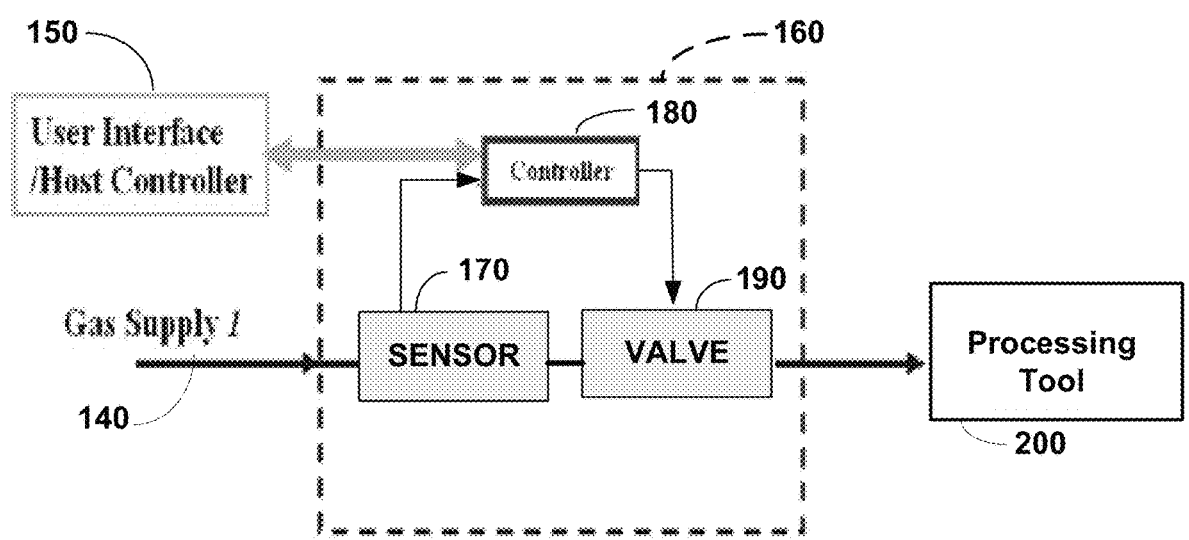
FIG. 3 is an embodiment of a gas delivery system using a high performance MFC and modified according to the teachings described herein.

Referring to FIG. 3, one embodiment of a high performance MFC 160 useful in controlling a high speed pulse delivery application is configured to be connected between a source of gas 140 and a processing tool 200 and to receive a series of instructions from a user interface/host controller 150 so as to provide a series of pulses of source gas to processing tool 200. High performance mass flow controller (MFC) 160, such as a πMFC manufactured and sold by the present assignee, includes a flow sensor 170 and an adjustable control valve 190. The sensor 170 senses the mass flow through the sensor, and provides a signal representative of the measured flow to the dedicated MFC controller 180. The dedicated controller 180 compares the measured flow with a flow set point so as to provide a control signal used to control the adjustable control valve 190 so that the output flow of the valve to the process tool 200, such as a process chamber, is maintained at the set point value.

In one embodiment according to the present disclosure, the MFC 160 has two modes of operation, providing one significant advantage over pressure based pulse gas delivery devices. A first mode is a traditional mass flow controller (MFC) mode, where a host controller 150 sends flow set point signals to the MFC 160 to control the flow delivered to the processing tool 200. A second mode is a pulse gas delivery (PGD) mode. In PGD delivery processes, MFC 160 is arranged to receive the pulse profile and the necessary profile and sequencing of pulses so that the MFC can deliver a gas from the supply 140 to the chamber 200 in accordance with a recipe including a profile and sequence of timed pulses provided by the user. The profile and sequencing of the pulses can be initially programmed by the information being downloaded from the user interface/host controller 150 to the dedicated MFC controller 180. The downloaded profile and sequencing allows the MFC to carry out all of the sequencing steps in response to a single trigger signal from the interface/controller 150. Using a dedicated MFC 160, the dedicated controller can be configured and arranged so as to carry out all of the sequencing steps in a well controlled and timely manner, freeing the host controller/interface to carry out all of its other functions without interfering with the pulse gas delivery.

The PGD mode provides operational steps for three delivery types of pulse gas delivery processes—time based delivery, mole based delivery, and profile based delivery providing a further advantage over the pressure based gas pulse delivery devices. In the time based pulse delivery process, the user is required to configure and arrange the dedicated MFC controller 180 with the following parameters for the process that is to be controlled: (1) at least one targeted flow set point ($Q_{sp}$), (2) at least one time length of the pulse-on period ($T_{on}$), (3) at least one time length of the pulse-off period ($T_{off}$), and (4) the total number of pulses (N) required to complete the process.

Figure 4:
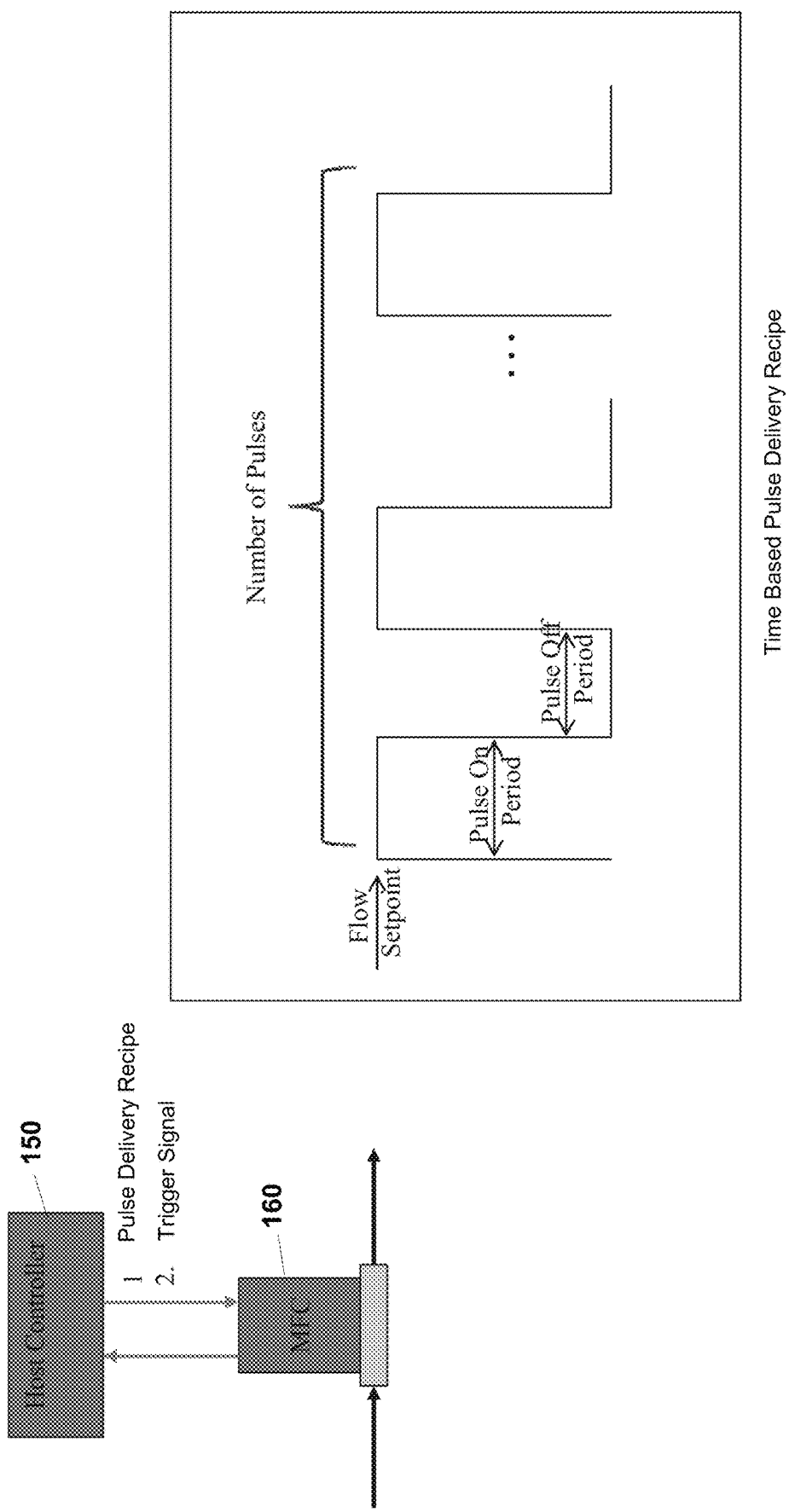
FIG. 4 illustrates a typical time based pulse gas delivery profile downloaded to the MFC so that the MFC can deliver a series of gas pulses without the need to interact with the host controller, and thus operate freely of the host controller overhead functions.

As shown in FIG. 4, the parameters are configured or downloaded from the host controller to the dedicated MFC controller of the MFC so that the MFC controller controls the pulse delivery as a function of these parameters. When the pulse gas delivery sequence is to be delivered, the host computer simply provides a trigger signal to the MFC, and the MFC carries out the sequence of pulses. As shown in FIG. 4, once the MFC 160 receives the trigger signal from the host controller 150 to start delivery, the MFC 160 controls the PGD process according to the recipe by turning the MFC on (controlling the flow to the targeted flow set point by regulating the openness of the valve) and off (controlling the flow to zero by closing the valve) based on the prescribed pulse on period and the pulse off period for each pulse period. This results in very good control of the sequencing, timing and duration of the pulses.

For mole based pulse delivery, a user specifies the following parameters: (1) mole delivery set point ($n_{sp}$), (2) the targeted time length of the pulse-on period ($T_{on}$), (3) the targeted time length of the pulse-off period ($T_{off}$), and (4) the number of pulses (N). Based on this information, the dedicated controller 180 of MFC 160 is configured and arranged so as to automatically adjust the flow set point to precisely deliver within the targeted pulse-on period the targeted mole amount of gas based on measurements taken by a flow sensor 170, according to the following equation:

$$\Delta n = \int_{t1}^{t2} Q \cdot dt \qquad (1)$$

wherein $\Delta n$ is the number of moles of gas delivered during the pulse-on period (between times t1 and t2); and Q is the flow rate measured by sensor 170 of the MFC 160 during the pulse-on period.

Thus, using the mole based pulse delivery mode, the MFC controls, and adjusts as necessary, the flow set point so as to control the number of moles delivered with each pulse. Based on these parameters, the MFC 160 automatically delivers N pulses of flow in a precise timing sequence, with each pulse delivering $\Delta n$ moles during the portion of each pulse on period ($T_{on}$) that the MFC is on, and turning the MFC off for the pulse off period ($T_{off}$). During operation of the mole based pulse delivery operation, the MFC 160 will automatically adjust the flow set point ($Q_{sp}$) based on the calculated mole amount of gas delivered of Eq. (1) using the flow sensor measurement (Q) in order to precisely deliver the desired number of moles within the targeted pulse-on period ($T_{on}$) for each pulse.

Mole based delivery is preferred (but not required) when multiple process tools are being used, or flow to different parts or devices of a process tool are required to be matched. In such a case multiple high performance MFCs are used to provide flow through the corresponding multiple delivery channels. To ensure that mole delivery is accurate, each MFC 160 uses feedback control loop from its flow sensor 170 to control its valve 190. Thus, when multiple delivery channels are used, there may be variations in response time, valve conductance, etc. In such a case mole based pulse delivery can be used to ensure that the amount (moles) of gas delivered with each pulse in each delivery channel is the same, regardless of these factors, since mole delivery will be independent of these factors. In one embodiment, feedback is used to correct the errors in the amount of gas delivered caused by valve response times.

It is contemplated that other parameters or other combinations of parameters may be used to control gas delivery. For example, for time based delivery an off flow set point can be entered for delivery of gas during the $T_{off}$ period, instead of defaulting to zero.

Repeatability and accuracy are improved by both time based and mole based delivery method using the dedicated controller of a MFC because the PGD control responsibility has been taken away from the host controller 150 (reducing delays due to work load) and because the signal transmission is closer to (and in fact within) the MFC 160 (reducing communication jitter), and the MFC itself is optimized for pulse gas delivery.

Figure 1:
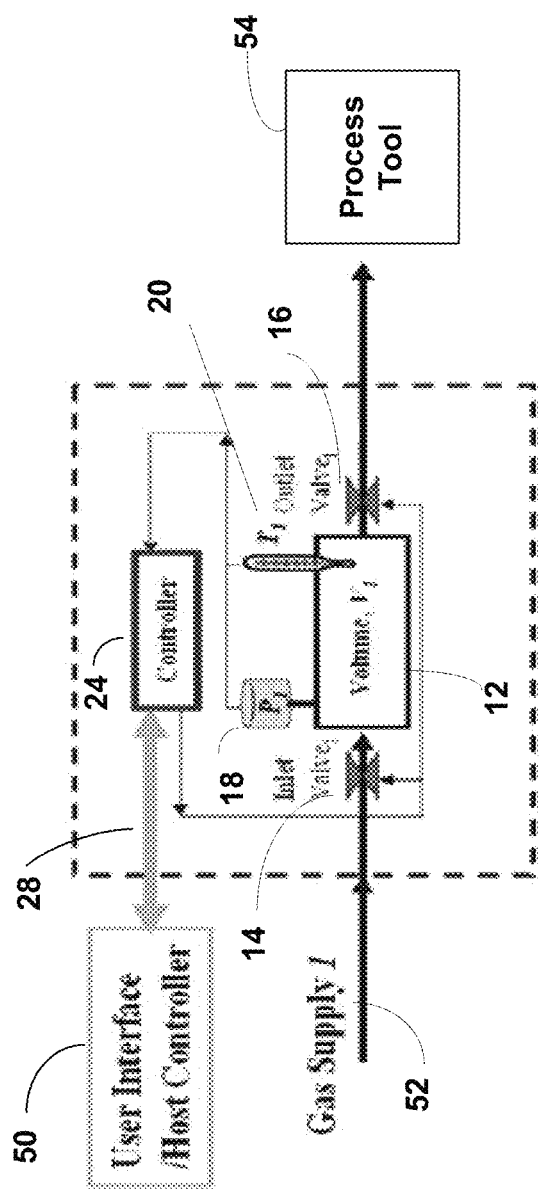
FIG. 1 is a block diagram of a prior art gas delivery system for providing high speed pulse delivery.
Figure 5:
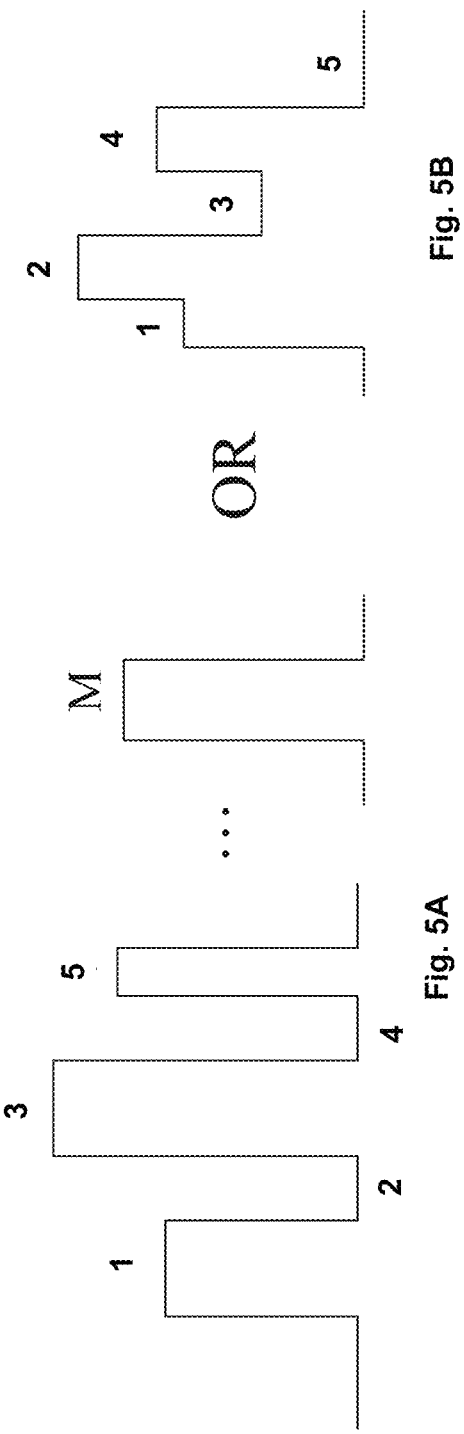
FIGS. 5A and 5B are examples of sets of profiles of M pulses for configuring the MFC controller so that the MFC controller can automatically deliver, in response to a trigger signal from the host controller, the M-pulse profile by turning on and off itself so as to generate the pulses in the sequence dictated by the recipe downloaded by the host computer.

Finally, the third mode of operation is the profile pulse mode. In one embodiment of the profile pulse type of delivery, a user creates a profile characterizing one or more pulses. For each pulse in the profile, the user specifies the flow set point and the corresponding on and off pulse period, i.e., (1) the flow set point $Q_{sp1}$ and a corresponding first pulse on and off period ($T_{on1}$ $T_{off1}$), (2) the flow set point $Q_{sp2}$ and a corresponding second pulse on and off period ($T_{on2}$ $T_{off2}$), . . . (m) the flow set point $Q_{spm}$ and a corresponding m-th pulse on and off period ($T_{onm}$ $T_{offm}$), etc. Thus, a set of parameters are provided for each pulse of the entire set of pulses, allowing the pulses to vary depending on the type of process being run. FIGS. 5A and 5B illustrate two examples of sets of pulse profiles. While in some embodiments, a user can define an ordinary on/off pulse with varying set points during $T_{on}$ (as seen in FIG. 5A), in other embodiments, the user may enter more than one flow set point for both the on period and off period such that a stair-step type profile can be created as seen in FIG. 5B. The latter is possible because the MFC employs a proportional control valve. Unlike a shutoff/on valve, the proportional control valve can be set at any position between a totally open position and a totally closed position, providing a further advantage over the pressure based PGD device, such as the one shown in FIG. 1. In the profile pulse delivery mode, the user can also specify the mole delivery set point ($n_{spi}$) instead of the flow set point $Q_{spi}$ along with the corresponding pulse on and off period ($T_{oni}$ $T_{offi}$) for each of the pulses in the profile recipe.

Thus, the MFC 160, and not the host controller 150, coordinates the opening and closings operation of the control valve 190 and, accordingly, gas delivery. Historically, MFCs were analog devices incapable of accurately performing such PDG control responsibilities with such relatively short pulses. Newer, digital MFCs, however, are capable of taking on the responsibility of controlling the proportional control valve of the MFC. Given the aforementioned need for faster PGD processes, higher repeatability and accuracy is achieved using the dedicated MFC controller 180 to run the PGD delivery process than would otherwise be possible. Instead of the host controller having to send signals to turn on and off the MFC, the process functions are carried out alone by the MFC 160 of FIG. 3, eliminating a significant amount of hardware while assuring more accurate delivery. The required control recipe parameters vary based on the type of PGD mode being used, as described in more detail below. The host controller 150 may also send an abort signal to the MFC controller 180 at any time to abort pulse gas delivery. For example, if a safety check fails, the host controller 150 may demand the MFC 160 to immediately stop triggered gas delivery sequencing that is in process. Similarly, if the host controller 150 detects that incorrect gas delivery is being performed, then the host controller 150 may send an abort signal. In this way the host computer 150 can continue to monitor other processes, while the gas delivery steps are dedicated to the dedicated controller 180 of MFC 160.

In various embodiments of the present disclosure, a host controller 150 can be used in conjunction with a plurality of MFCs 160 used with a corresponding number of delivery channels as mentioned above. The host controller 150 sends timely trigger signals to each MFC 160. The host controller 150, thus, can offset trigger signals to sequentially or simultaneously trigger the plurality of MFCs 160. In this configuration, the host controller 150 may stagger the trigger signals so that the delivery channels do not deliver gas simultaneously. For example, suppose control parameters define a $T_{on}$ of 0.25 s and $T_{off}$ of 0.75 s in each of two MFCs 160. If the host controller 150 sends a trigger signal to the second MFC 0.5 s after triggering the first MFC, then the process tool 200 will receive delivery of gas equivalent to a $T_{on}$ of 0.25 s and $T_{off}$ of 0.25 s (if the two gas chambers are filled with the same gas).

Test results using the disclosed approach indicated an improvement in the repeatability error over the experimental approach using a host computer to control the process by two orders of magnitude.

Figure 6:
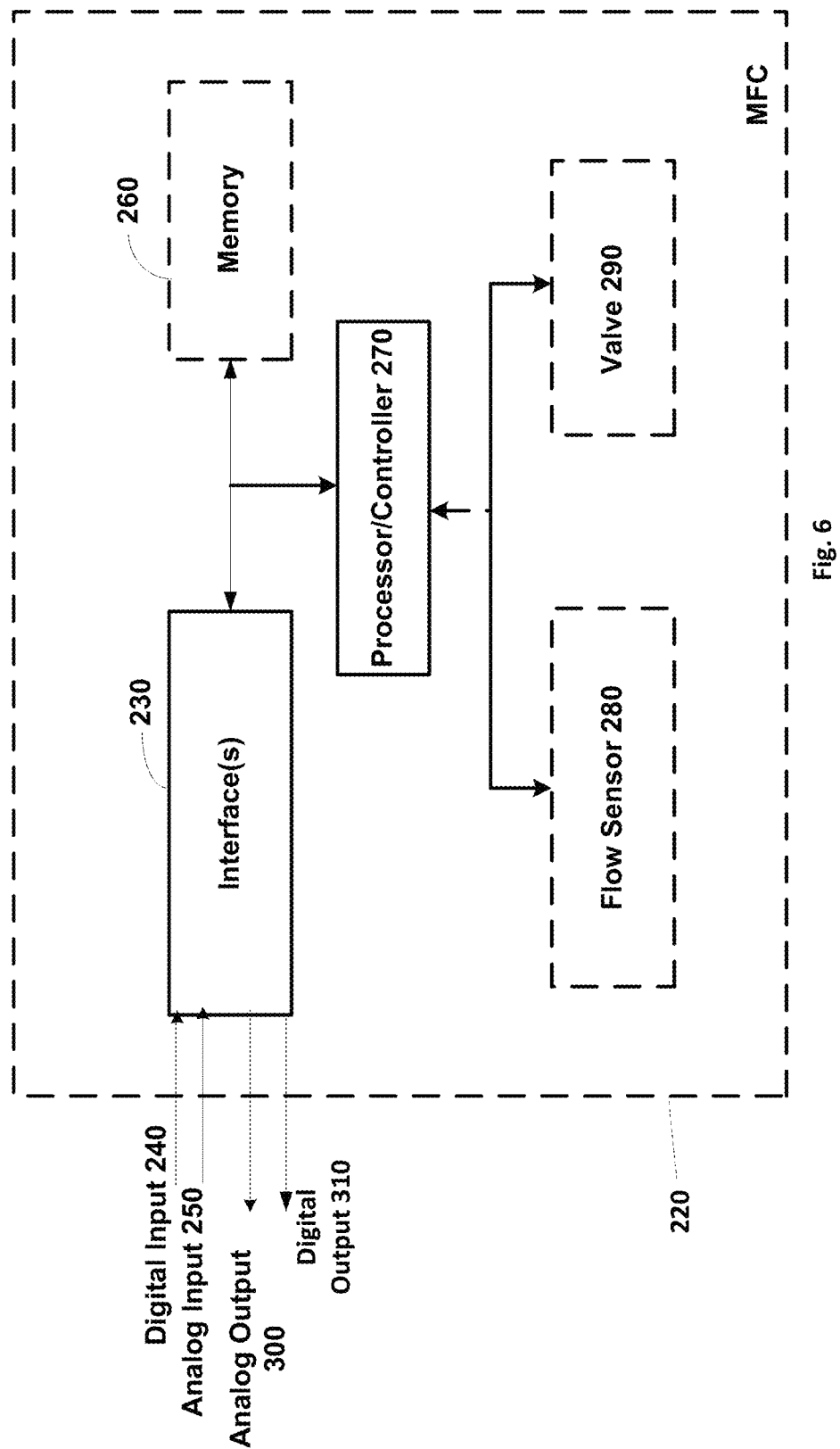
FIG. 6 is a simplified block diagram of one embodiment of an electronic system of a mass flow controller.

Embodiments incorporating further improvements are illustrated in FIGS. 6-9. As shown in FIG. 6, a high performance MFC 220 can include one or more interfaces 230 which can be configured to provide communication ports capable of receiving both at least one digital signal input as shown at 240, and at least one analog signal input 250; and at least one digital signal output as shown at 310, and at least one analog signal output 300. In such an arrangement, for example, a recipe can be downloaded to the MFC memory 260 through the digital input 240 of the interface, and the trigger signal can be provided through the analog input 240 of the interface to start the MFC delivery gas in accordance with the stored recipe. The processor/controller 270 receives signals from the flow sensor 280 of the MFC and controls the control valve 290 according to the recipe and the sensed flow. The one or more interfaces 230 can also be configured to include at least one analog signal output 300 and digital signal output 310. These outputs can be used for example as signals provided to other devices or tools.

With the configuration shown, the illustrated embodiment of the mass flow controller (MFC) 220 is thus a programmable MFC, including at least an input (such as the analog signal input shown at 250) configured to receive an input signal, an output (such as analog signal output 300 or digital signal output 310) configured to provide an output signal, and a communication port (such as digital signal input 240) configured to receive program instructions including instructions for the programmed or operational configuration of the MFC 220, and programming data used by the MFC. MFC 220 also includes flow sensor 280 configured to sense the flow of gas through the mass flow controller, a control valve 290 configured to control the flow of gas though the mass flow controller and memory 260 configured and arranged to receive programming data including data determining the programmed configuration of the mass flow controller as either a digital or analog configuration for trigging the gas delivery. The processor/controller 270 operates the mass flow controller 220 in accordance with the programmed configuration. When the system configuration is programmed as a digital configuration, the programmed digital configuration enables the mass flow controller to respond to digital signals applied to the input 240. Alternatively, when the system configuration is programmed as an analog configuration, the programmed analog configuration enables the mass flow controller to respond to analog signals applied to the input 250.

The input configured as a communication port in the illustrated embodiment is also configured to receive data relating to parameters associated with at least one of two modes of operation of the mass flow controller. The modes of operation of the mass flow controller can include a classic mass flow controller mode of operation, wherein the input signal represents the set point setting for operating the MFC in the classic mass flow controller mode of operation. The other mode of operation can include a pulse gas delivery mode of operation, wherein the input signal represents a pulse trigger signal for operating the MFC so as to deliver a sequence of pulses in the pulse gas delivery mode of operation. Thus, the communication port is configured to receive parameters for pulse gas delivery. The parameters can be associated with a mole delivery mode of gas pulse delivery operation. The parameters can also include the pulse-on period, pulse-off period, the mole delivery set point, and the number of pulses.

Figure 7:
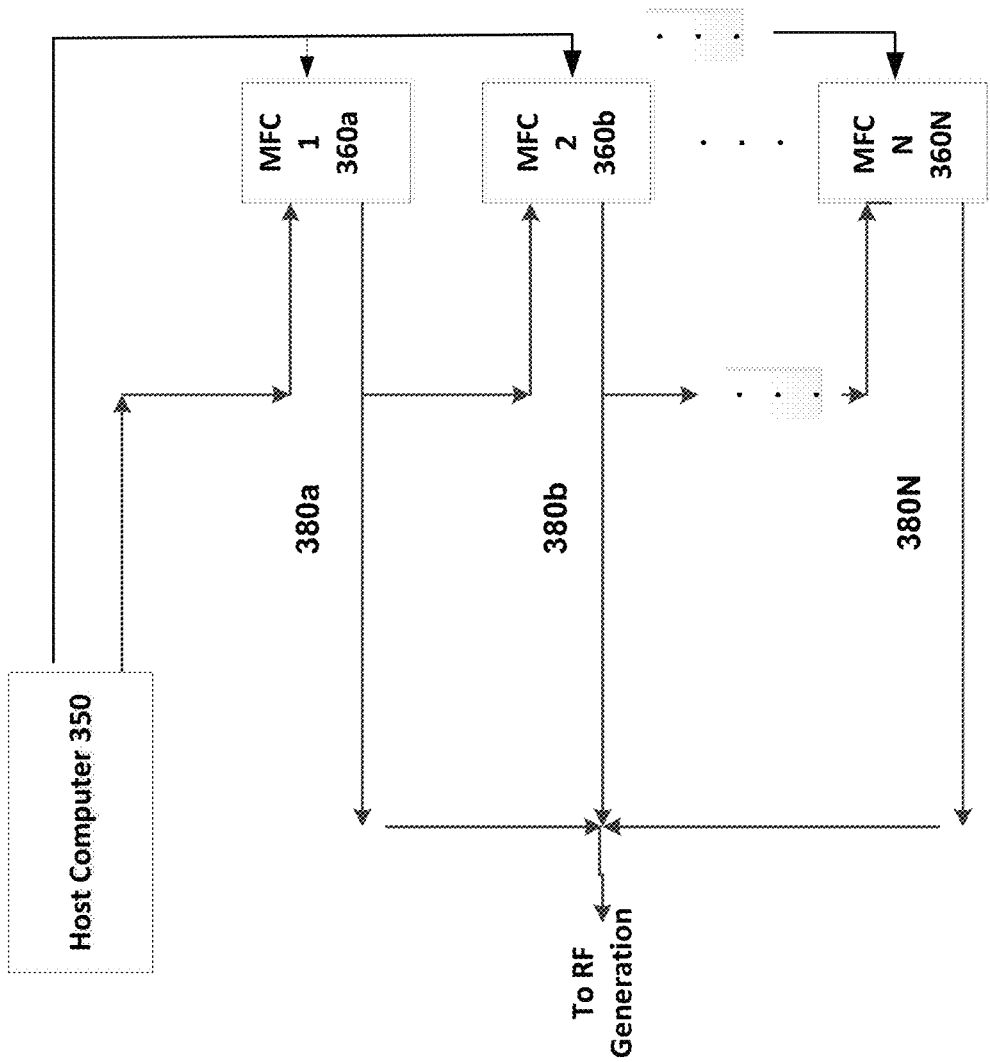
FIG. 7 is a block diagram of one embodiment of a system arrangement including a host computer and a plurality of connected high performance mass flow controllers.

The illustrated embodiment of the communication interface 230 thus includes the digital communication port, an analog input or pin for forming an input arranged to receive an analog trigger signal input, and an analog output or pin configured to form the output for providing an analog signal output. The analog signal output can be used to synchronize the operation of the MFC with the operation of another device or tool. This is particularly useful where two devices each provide a sequence of pulses (which can be the same or different sequence) which must be synchronized with each other, or the two devices each provide a pulse synchronized with the pulse of the other device. For example, as shown in FIG. 7, the other device can be, for example, another high performance MFC and/or a RF generator and/or a pressure controller. This enables the synchronization of the various tool devices when they are being used to simultaneously carry out parallel steps for a common process or different processes.

As shown in FIG. 7, a host computer at 350 can download the pulse sequences to each of the MFCs 360 over the digital communication bus 370. In the illustrated embodiment, the outputs of the MFCs are connected in a successive daisy chain arrangement, and each output signal 380 can also be split and re-routed to provide to other devices on a process tool, such as a RF generator, a plasma generator or a pressure controller, and/or in other embodiments to tool devices on different process tools. In an exemplary embodiment, when the process begins, a trigger signal is sent to the first MFC 360a. The first MFC 360a delivers a sequence of pulses in accordance with the sequence programmed in its memory. At a certain prescribed time, the synchronization output of the first MFC 360a is provided as a trigger signal input to the second MFC 360b as well as to the tool device of, for example, a RF generator, The sequence proceeds with each successive MFC 360. Each trigger signal thus synchronizes the operation of one MFC with the next MFC in the daisy chain arrangement of any number of MFCs (generally indicated in FIG. 7 by N). The synchronization signal of one MFC can be generated prior to the completion of the delivery of the sequence of pulses by the MFC. Alternatively, the synchronization signal can be generated simultaneously with the completion of the delivery of the sequence of pulses, or the synchronization signal can be generated after the completion of the delivery of the sequence of pulses by a predetermined delay. It should be noted that the pulse trigger signal can be a digital or an analog signal. In one embodiment the output signal is a TTL synchronization output signal for use by another device.

Figure 8:
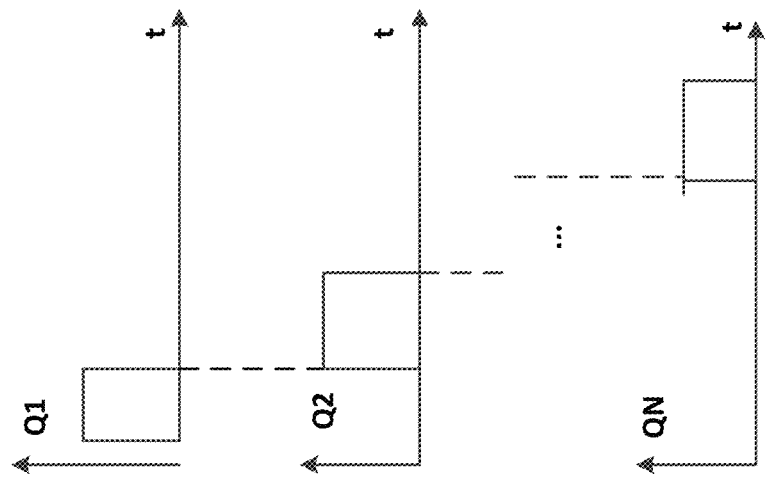
FIG. 8 is a timing diagram illustrating an example of the interrelationship of the operation of the mass flow controllers shown in FIG. 7.

Referring still to FIG. 7, the illustrated system embodiment shown can operate as a multi-channel gas delivery system including a plurality N of flow channels 380, each channel comprising a mass flow controller 360 configured to control the flow of gas through the corresponding channel. In the illustrated arrangement, each MFC can be arranged to provide at least one pulse of gas, with the MFCs being connected in series (a daisy chain arrangement). In this way each MFC can provide the same or different gases to the tool, each as a pulse of a prescribed duration as best seen in FIG. 8. Further, the quantity (e.g., mass) of gas of each delivered pulse can vary from channel to the channel.

As shown in FIG. 8, in this embodiment the MFCs 360 can be synchronized to simultaneously deliver each pulse when the previous pulse ends. As noted above, each successive pulse can be delayed relative to the previous pulse, or commence prior to the end of the previous pulse, or some combination of any two or all three synchronization arrangements.

Figure 9:
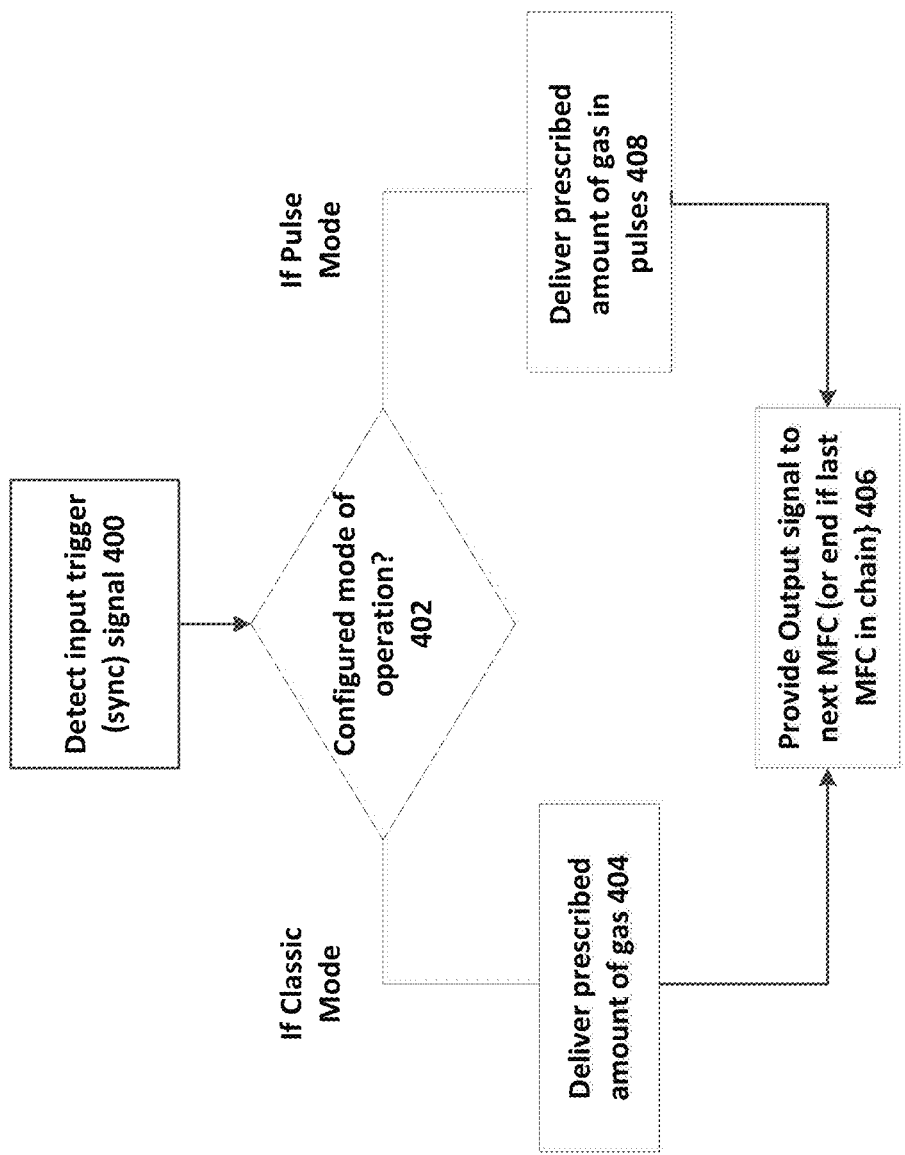
FIG. 9 is a typical flow control diagram of one embodiment of a mass flow controller such as the one illustrated in FIG. 6, used in the system of FIG. 7.

As described above, the digital communication port of each mass flow controller can be configured to receive data relating to parameters associated with at least one of two modes of operation of the mass flow controller. The MFC can be configured to operate in a classic mode of gas delivery operation, or pulse mode of gas delivery operation. As shown in FIG. 9, when an input trigger is received at step 400, if the MFC is configured to operate in the classic mass flow controller mode at 402 it proceeds to step 404 and delivers a prescribed amount of gas by sensing the actual flow with the sensor, and controlling the control valve based on the sensed flow and the received flow setpoint. The MFC then proceeds to the step 406 and provides an output signal for the next MFC, or if functioning alone or if the last MFC in the chain, the process ends. Similarly, if operating in the pulse mode the process proceeds from step 402 to 408 to deliver the prescribed amount of gas in pulses. The process then proceeds to step 406.

When operating in a pulse mode delivery, the parameters can be associated with a mole delivery mode of gas pulse delivery operation. In such a configuration, the parameters include the pulse-on period, pulse-off period, the mole delivery setpoint, and the number of pulses.

As described, the gas delivery system reliably measures the amount of material (mass) flowing into the semiconductor tool, and provides for accurate delivery of the mass of a gas in pulses of relatively short duration in a reliable and repeatable fashion. Further, the system employs a more simplified operation, while providing delivery of the desired number of moles of gas over a wide range of values, without the need to divert gas to achieve the accurate, reliable and repeatable results.

The components, steps, features, objects, benefits and advantages which have been discussed are merely illustrative. None of them, nor the discussions relating to them, are intended to limit the scope of protection in any way. Numerous other embodiments are also contemplated. These include embodiments which have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications which are set forth in this specification, including in the claims which follow, are approximate, not exact. They are intended to have a reasonable range which is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials which have been described and their equivalents. Similarly, the phrase "step for" when used in a claim is intended to and should be interpreted to embrace the corresponding acts which have been described and their equivalents. The absence of these phrases in a claim mean that the claim is not intended to and should not be interpreted to be limited to any of the corresponding structures, materials, or acts or to their equivalents.

Nothing which has been stated or illustrated is intended or should be interpreted to cause a dedication of any component, step, feature, object, benefit, advantage, or equivalent to the public, regardless of whether it is recited in the claims.

The scope of protection is limited solely by the claims which now follow. That scope is intended and should be interpreted to be as broad as is consistent with the ordinary meaning of the language which is used in the claims when interpreted in light of this specification and the prosecution history which follows and to encompass all structural and functional equivalents.

Reference is made to U.S. patent application Ser. No. 13/344,387, entitled SYSTEM FOR AND METHOD OF FAST PULSE GAS DELIVERY, filed Jan. 5, 2012 in the names of Junhua Ding, Michael L'Bassi and Tseng-Chung Lee and assigned to the present assignee; U.S. patent application Ser. No. 12/893,554, entitled SYSTEM FOR AND METHOD OF FAST PULSE GAS DELIVERY, filed Sep. 29, 2010 in the name of Junhua Ding, and assigned to the present assignee, now U.S. Pat. No. 8,997,686, issued Apr. 7, 2015; U.S. patent application Ser. No. 13/035,534, entitled METHOD AND APPARATUS FOR MULTIPLE-CHANNEL PULSE GAS DELIVERY SYSTEM, filed Feb. 25, 2011 in the name of Junhua Ding and assigned to the present assignee, now U.S. Pat. No. 9,348,339, issued May 24, 2016, and U.S. patent application Ser. No. 13/193,393, which is now abandoned, entitled Systems and Methods of Controlling Time-Multiplexed Deep Reactive-Ion Etching Processes, filed Jul. 28, 2011 in the name of Vladislav Davidkovich et al. and assigned to the present assignee. The entire teachings of the above applications are incorporated herein by reference.

What is claimed is:

1. A system comprising:
  a multi-channel gas delivery system including a plurality of flow channels, each channel comprising a mass flow controller configured to control the flow of gas through the corresponding channel and including:
    an input configured to receive an input signal;
    an output configured to provide an output signal;
    a communication port configured to receive program instructions including instructions on the operational configuration of each mass flow controller;
    a flow sensor configured to sense the flow of gas through the mass flow controller of the corresponding channel;
    a control valve configured to control the flow of gas though the mass flow controller of the corresponding channel;
    memory configured and arranged to receive programming data determining the programmed configuration of the mass flow controller; and
    a processor/controller for operating the mass flow controller in accordance with the programmed configuration;
  wherein the input signal to the mass flow controller initiates the operation of the mass flow controller to deliver a prescribed amount of gas, and the output signal is generated as a function of the timing of the delivery so that the output signal can be used to synchronize each mass flow controller to at least one other device.

2. A system according to claim 1, wherein the output signal of at least one mass flow controller is used as an input signal to initiate the operation of another one of the mass flow controllers of the multi-channel fast pulse gas delivery system to deliver a prescribed amount of gas so that the mass flow controllers define a daisy chain of devices sequentially providing the delivery of prescribed amounts of gas through the corresponding channels.

3. A system according to claim 1, wherein the output signal of each of the mass flow controllers is used to provide control signals applied to an RF power generator.

4. A system according to claim 1, wherein the output signal of each of the mass flow controllers is used to provide control signals applied to a pressure controller.

5. A system according to claim 1, wherein the input and output signals are analog signals.

6. A system according to claim 1, wherein the communication port of each mass flow controller is configured to receive data relating to parameters associated with at least one of two modes of operation of the mass flow controller.

7. A system according to claim 1, further including a digital communication interface that includes the communication port.

8. A system according to claim 1, further including both a digital communication interface and an analog communication interface.

9. A system according to claim 1, further including an analog communication interface having an analog input pin for forming the input and receiving an analog trigger signal input, and an analog output pin for forming the output and providing an analog synchronization signal output.

10. A system according to claim 9, wherein the analog synchronization signal is generated prior to the completion of the delivery of the sequence of pulses.

11. A system according to claim 9, wherein the analog synchronization signal is generated simultaneously with the completion of the delivery of the sequence of pulses.

12. A system according to claim 9, wherein the analog synchronization signal is generated after the completion of the delivery of the sequence of pulses by a predetermined delay.

13. A system according to claim 1, wherein the output signal is a TTL synchronization output signal for use by another device.

14. A method of operating a mass flow controller of the type comprising at least one communication port, the method comprising:

receiving, at the communication port, program instructions including instructions relating to the operational configuration of the mass flow controller; and operating the mass flow controller in accordance with the programmed configuration including generating an output signal representing a synchronization signal for use in synchronizing the timing of the delivery of a sequence of pulses with the operation of another device.

15. A method of operating a mass flow controller according to claim 14, wherein a programmed digital operational configuration enables the mass flow controller to respond to digital signals applied to the input.

16. A method of operating a mass flow controller according to claim 14, wherein a programmed analog operational configuration enables the mass flow controller to respond to analog signals applied to the input.

17. A method of operating a mass flow controller according to claim 14, wherein receiving at the communication port program instructions includes receiving data relating to parameters associated with at least one of two modes of operation of the mass flow controller.

18. A method of operating a mass flow controller according to claim 17, wherein at least one of two modes of operation of the mass flow controller includes a classic mass flow controller mode of operation, and the input signal represents the set point setting for operating the MFC in the classic mass flow controller mode of operation.

19. A method of operating a mass flow controller according to claim 14, wherein the program instructions configure the mass flow controller as responsive to either digital or analog input signals.

20. A method of operating a mass flow controller according to claim 19, wherein the another device is a second mass flow controller.

21. A method of operating a mass flow controller according to claim 20, wherein the synchronization signal is a trigger signal for use as an input to the second mass flow controller.

22. A method of operating a mass flow controller according to claim 19, wherein the another device is an RF power generator.

23. A method of operating a mass flow controller according to claim 19, wherein the another device is a pressure controller.

24. A method of operating a mass flow controller according to claim 19, further including generating the synchronization signal prior to the completion of the delivery of the sequence of pulses.

25. A method of operating a mass flow controller according to claim 19, further including generating the synchronization signal simultaneously with the completion of the delivery of the sequence of pulses.

26. A method of operating a mass flow controller according to claim 19, further including generating the synchronization signal by a predetermined delay after the completion of the delivery of the sequence of pulses.

27. A method of operating a mass flow controller according to claim 21, wherein the trigger signal is generated as a digital signal.

28. A method of operating a mass flow controller according to claim 21, wherein the trigger signal is generated as an analog signal.

29. A method of operating a mass flow controller according to claim 19, wherein the output signal is a TTL synchronization output signal for use by another device.

30. A method of operating a multi-channel gas delivery system including a plurality of flow channels, each channel comprising a mass flow controller configured to control the flow of gas through the corresponding channel, the method comprising:

providing an input signal to one of the mass flow controllers so as to initiate the operation of the mass flow controller to deliver a prescribed amount of gas;

generating an output signal from the mass flow controller as a function of the timing of the delivery of the prescribed amount of gas so that the output signal can be used to synchronize each mass flow controller to at least one other device;

receiving program instructions at a communication port including instructions on the operational configuration of each mass flow controller;

determining the programmed configuration of the mass flow controller as a function of the received instructions; and operating the mass flow controller in accordance with the programmed configuration;

wherein the input signal to the mass flow controller initiates the operation of the mass flow controller to deliver a prescribed amount of gas, and the output signal is generated as a function of the timing of the delivery so that the output signal can be used to synchronize each mass flow controller to at least one other device.

31. A method of operating a multi-channel gas delivery system according to claim 30, further including using the output signal of at least one mass flow controller as an input signal to initiate the operation of another one of the mass flow controllers of the multi-channel fast pulse gas delivery system to deliver a prescribed amount of gas so that the mass flow controllers define a daisy chain of devices sequentially providing the delivery of prescribed amounts of gas through the corresponding channels.

32. A method of operating a multi-channel gas delivery system according to claim 30, further including applying the output signal of each of the mass flow controllers as a control signal to an RF power generator.

33. A method of operating a multi-channel gas delivery system according to claim 30, further including applying the output signal of each of the mass flow controllers as a control signal to a pressure controller.

34. A method of operating a multi-channel gas delivery system according to claim 30, wherein the input and output signals are analog signals.

35. A method of operating a multi-channel gas delivery system according to claim 30, further including receiving at a digital communication port of each mass flow controller data relating to parameters associated with at least one of two modes of operation of each such mass flow controller.

36. A method of operating a multi-channel gas delivery system according to 35, wherein receiving at a digital communication port of each mass flow controller data relating to parameters associated with at least one of two modes of operation of each such mass flow controller includes receiving parameters for pulse gas delivery.

37. A method of operating a multi-channel gas delivery system according to claim 36, wherein receiving at a digital communication port of each mass flow controller data relating to parameters associated with at least one of two modes of operation of each such mass flow controller includes receiving parameters associated with a mole delivery mode of gas pulse delivery operation.

38. A method of operating a multi-channel gas delivery system according to claim 37, wherein the parameters include the pulse-on period, pulse-off period, the mole delivery setpoint, and the number of pulses.

39. A method of operating a multi-channel gas delivery system according to claim 30, wherein the output signal of each mass flow controller is an analog synchronization signal, and further including generating the analog synchronization signal prior to the completion of the delivery of the sequence of pulses by the mass flow controller.

40. A method of operating a multi-channel gas delivery system according to claim 39, wherein the analog synchronization signal is generated simultaneously with the completion of the delivery of the sequence of pulses.

41. A method of operating a multi-channel gas delivery system according to claim 39, wherein the analog synchronization signal is generated after the completion of the delivery of the sequence of pulses by a predetermined delay.

42. A method of operating a multi-channel gas delivery system according to claim 30, wherein the output signal of each mass flow controller is a TTL synchronization output signal for use by another device.

43. A method of operating a multi-channel gas delivery system according to claim 30 wherein the programmed configuration of the mass flow controller is determined to be either a digital or analog configuration.

44. A system according to claim 1 wherein the programmed configuration of the mass flow controller is determined to be either a digital or analog configuration.

* * * * *